United States Patent [15] 3,701,078

Lynch [45] Oct. 24, 1972

[54] BUSSING CONNECTOR

[72] Inventor: James Edward Lynch, Harrisburg, Pa.

[73] Assignee: AMP Incorporated, Harrisburg, Pa.

[22] Filed: Feb. 4, 1971

[21] Appl. No.: 112,602

[52] U.S. Cl. ....................339/19, 339/17 L

[51] Int. Cl. ....................H01r 31/08

[58] Field of Search........339/17, 19, 22, 75, 176 CF, 339/176 LN, 176 MF, 176 MP; 317/100, 101 DH; 24/259 DF, 255 A

[56] References Cited

UNITED STATES PATENTS

| | | | |
|---|---|---|---|
| 3,492,538 | 1/1970 | Fergusson | 317/101 |
| 3,395,318 | 7/1958 | Laermer et al. | 317/100 |
| 3,345,541 | 10/1967 | Cobaugh et al | 317/101 |
| 3,084,302 | 4/1963 | Braeutigam | 339/17 |
| 3,489,990 | 1/1970 | Parker et al | 339/75 MP |
| 3,047,831 | 7/1962 | Mavewski | 339/176 MP |
| 3,102,767 | 9/1963 | Schneck | 339/176 MF |
| 1,216,468 | 2/1917 | Lee | 24/259 PF |
| 1,491,286 | 4/1924 | Calhoun | 24/255 A |

*Primary Examiner*—Stephen J. Novosad
*Assistant Examiner*—Robert A. Hafer
*Attorney*—William J. Keating, Ronald D. Grefe, Gerald K. Kita, Frederick W. Raring, Jay L. Seitchik, John R. Flanagan and Allan B. Osborne

[57] ABSTRACT

A holder simultaneously operating as a bussing connector for discrete electrical circuits paths on opposed sides of a substrate. The holder is mounted on a circuit board and is provided with discrete electrical paths receiving the discrete electricaL paths of the circuit board. An elongated clamp retains the circuit paths of the holder in electrical contact with the electrical paths of the circuit board. The clamp additionally retains the holder in clamped position on the circuit board.

7 Claims, 8 Drawing Figures

INVENTOR
JAMES EDWARD LYNCH
BY Gerald K. Kita

BUSSING CONNECTOR

The present invention relates generally to a substrate holder, and, more specifically, to a holder for a card or printed circuit board which simultaneously operates as a bussing connector for discrete electrical circuit paths on opposed sides of the substrate.

In a typical application of the present invention, the substrate may comprise a card or circuit board provided with protruding fine wires typically operating as magnetic memories and protruding from wafers carried on opposed sides of the substrate. It is desireable that the fine wire memories on one side of the substrate be electrically connected independently through independent circuit paths to corresponding fine wire memories on the opposed side of the substrate. According to the invention, a channel shaped holder forms a mounting means for plural discrete circuit paths. In a preferred embodiment, the circuit paths comprise a plurality of plated grooves provided in the surface of the channel shaped holder. The edge margin of the substrate is received in the channel shaped holder, and the discrete fine wire memories are aligned, for example, by a combing operation, in electrical engagement with corresponding plated grooves. A clamp compressibly retains the holder in clamped relationship on the edge margin of the substrate. Additionally, the clamp overlies and clampingly retains the fine wire memories in registration with the plated grooves. The clamp may be of single piece configuration or may alternatively comprise a series of independently operated clamps.

It is therefore an object of the present invention to provide a substrate holder which simultaneously operates as a bussing connector for discrete electrical circuit paths on opposed sides of the substrate.

Another object of the present invention is to provide a bussing connector for discrete electrical circuit paths on opposed sides of a substrate, including substrate holder having discrete circuit paths therein, and further including a clamp for positively retaining the circuit paths of the substrate in electrical engagement with the circuit paths of the holder.

Yet another object of the present invention is to provide a substrate holder with a plurality of discrete circuit paths and a clamp, either of single piece construction, or comprising a series of independently operated clamps, for clampingly retaining the holder in engagement with the substrate and for clampingly retaining plural discrete circuit paths of the substrate in electrical contact with the discrete electrical circuit paths of the holder.

Other objects and many attendant advantages of the present invention will become apparent upon perusal of the following detailed description taken in conjunction with the accompanying drawings, wherein.

Figures 1, 2:
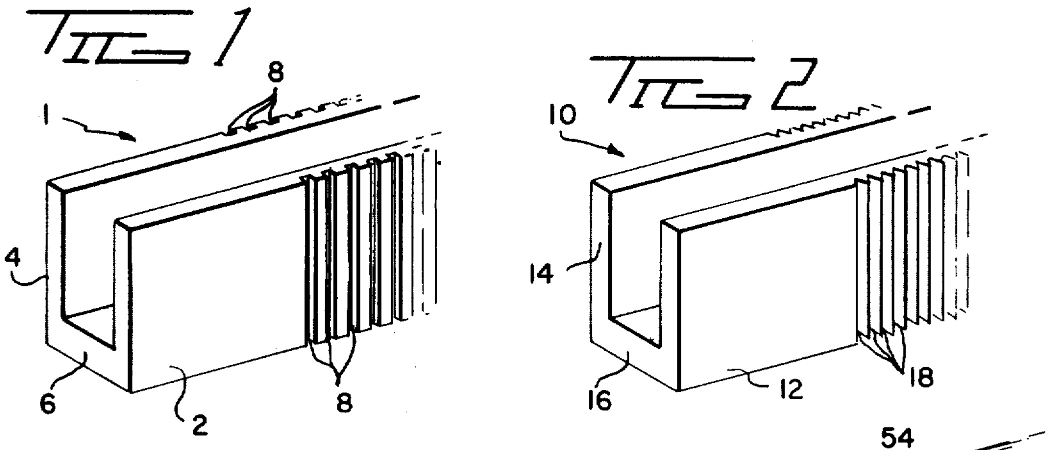
FIG. 1 is a fragmentary perspective of a substrate holder provided with a plurality of discrete electrical paths according to a preferred embodiment of the present invention.
FIG. 2 is a fragmentary perspective of a modified substrate holder according to the present invention.

With more particular reference to FIG. 1 of the drawings, a preferred embodiment of a card holder is generally shown at 1 and comprises a pair of laterally spaced parallel sidewalls joined together by a common, generally rectangular base portion 6. Together the sidewalls and the base portion define a generally channel shaped configuration. A plurality of parallel adjacent grooves 8 are provided in the surface of the sidewall 2, each of the grooves extending continuously over the surface of the sidewall 2, the base portion 6 and the other sidewall 4. As shown, the grooves are on the exterior surface of the holder 1, but it is understood that the grooves also may be on the interior surface thereof. Additionally, each of the grooves is of generally rectangular cross section. However any desireable cross section may be utilized. In a typical application, the holder 1 may be fabricated from a suitable electrically insulating material. The grooves 8, provided in the surface of the holder, are selectively plated to provide plural discrete electrical circuit paths, for a purpose to be described hereinafter.

With reference to FIG. 2, an alternative embodiment of the holder according to the present invention is generally indicated at 10 and comprises a pair of parallel spaced sidewalls 12 and 14 connected together at their ends thereof by a base portion 16 thereof. Together, the sidewalls and the base portion define a generally U-shaped channel similar to the channel according to the preferred embodiment illustrated in FIG. 1. A series of generally V-shaped notches 18 are provided in the exterior surface of the channel 10 and extend continuously over the sidewall 12, the base portion 16 and the sidewall 14. In the embodiment of FIG. 2, the holder 10 may be fabricated from an electrical insulation material with the interior surfaces of the notches 18 being plated with a conducting material. As shown, each of the notches 18 is contiguous with an adjacent notch to form a generally serrated appearance. Plating material may be advantageously applied continuously over the contiguous notches 18, thereby eliminating the need for selectively plating each notch separately from another.

Figure 6:
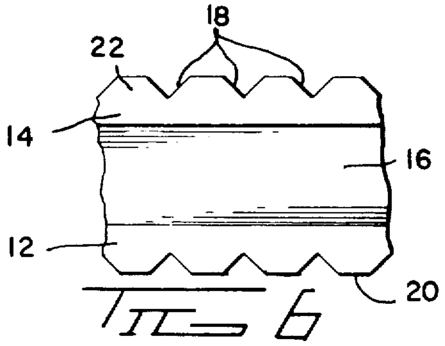
FIG. 6 is an enlarged fragmentary plan view of a modified substrate holder according to the present invention, the initial configuration thereof being shown in FIG. 2.

With reference to FIG. 6, the exterior surface 20 of the sidewall 12 is then partially removed, for example, by a grinding operation. Such procedure eliminates the serrated appearance of the series of notches 18 and removes a portion of the plating material at the intersection of adjacent notches. Thus by removing a portion of the sidewall surface 20, the remaining plated surfaces of the notches provide plural discrete electrical paths in the surface of the sidewall 12. In like manner, the exterior surface 22 of the sidewall portion 14 and the exterior surface (not shown) of the base portion 16 is partially removed in a similar manner in order to provide a plurality of discrete plated electrical paths extending continuously along the sidewall 12, the base portion 16 and the sidewall 14.

Figures 3, 4:
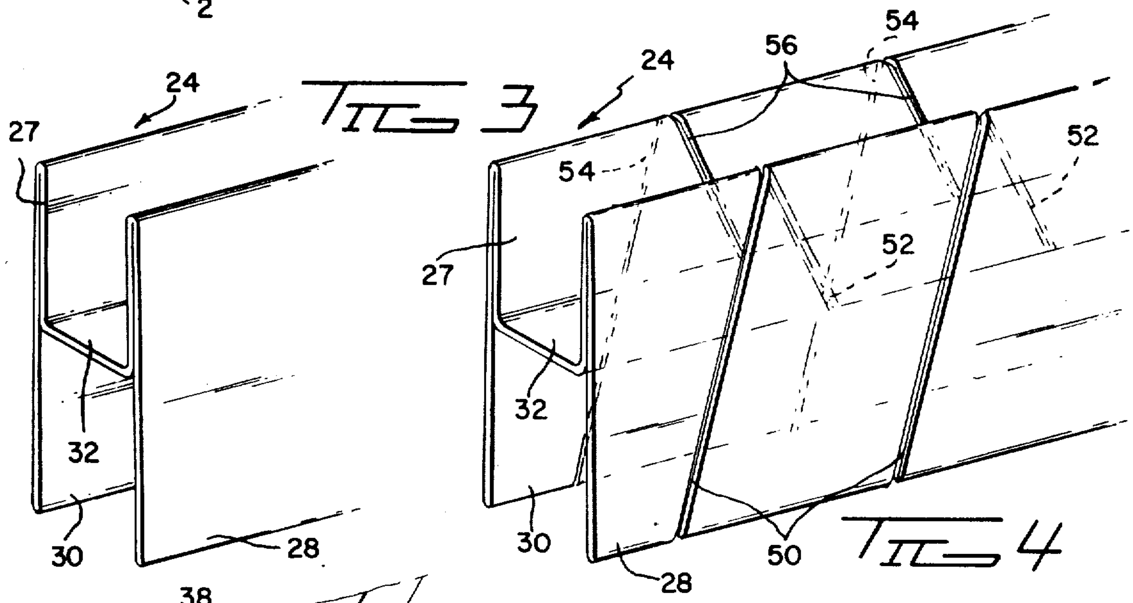
FIG. 3 is a fragmentary perspective of a single piece clamp according to a preferred embodiment of the present invention.
FIG. 4 is a fragmentary perspective of a modified clamp configuration comprising a series of independently operable clamps.
Figure 5:
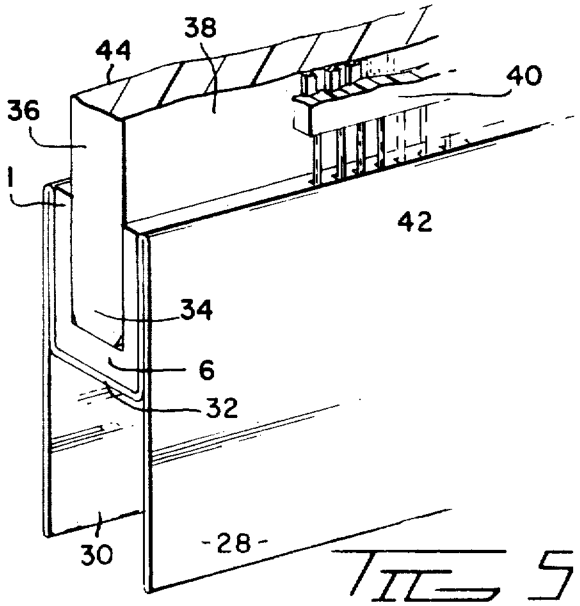
FIG. 5 is a fragmentary perspective of a selected substrate holder and a selected clamp in assembled relationship on the edge margin of a substrate and further illustrating the clamp retaining the discrete circuit paths of a wafer provided on the substrate retained in electrical engagement with the discrete circuit paths of the holder by the resilient action of the clamp.
Figures 7, 8:
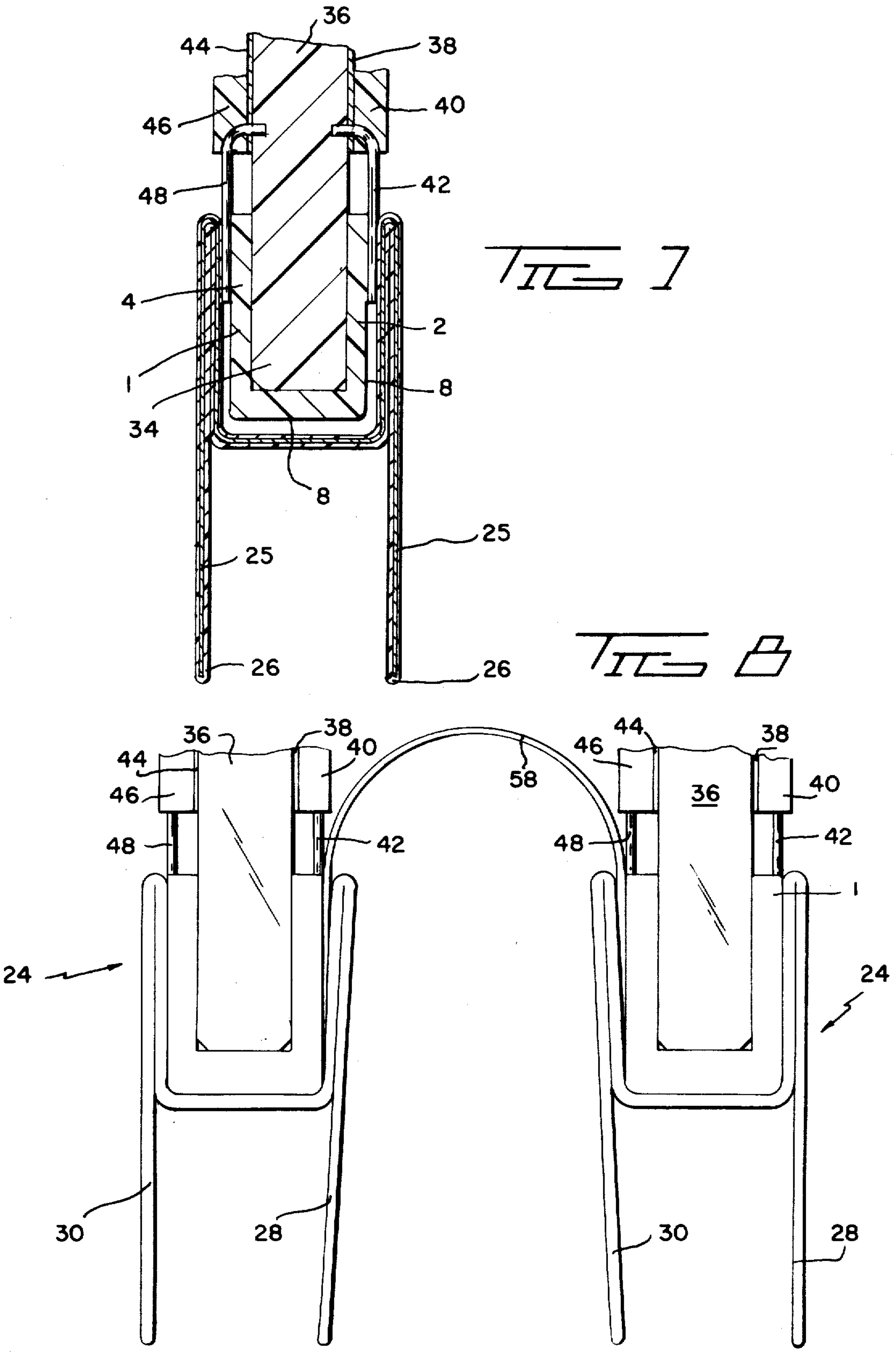
FIG. 7 is an enlarged cross section of the embodiment shown in FIG. 5.
FIG. 8 is an enlarged elevation illustrating a pair of bussing connectors according to the embodiment of FIG. 7 joined electrically together in lateral spaced relationship by a flexible flat conductor cable.

With reference to FIGS. 3 and 7, a preferred embodiment of the clamping apparatus will be described in detail. The clamping apparatus is generally indicated at 24 and includes an elongated strip of a resilient material such as spring metal 25 coated thereover with a layer of insulation material 26. A central portion of the elongated strip is formed into a generally U-shaped configuration 27 defining jaws of a selected dimension sufficient to receive and clampingly retain either of the channel shaped holders 1 or 10 therein. Each portion of the continuous strip laterally of the U-shaped configuration is doubled back on itself to form generally elongated rectangular flange portions 28 and 30. As shown in FIG. 3, the flange portions 28 and 30 project beyond the base portion 32 of the channel shaped configuration 26. The flange portions 28 and 30 define a pair of levers which are pivotable toward each other with the base portion 32, extending laterally therebetween, serving as the common fulcrum for a purpose to be explained hereinafter.

With reference to FIGS. 1, 3, 5 and 7, a typical application of the preferred embodiment will be described in detail. With reference to the Figures, the holder 1 is assembled over the edge margin 34 of a substrate in the form of a circuit board or card, a portion of which is shown at 36. The surface 38 of the substrate 36 is provided thereon with a wafer, a portion of which is generally indicated at 40. The wafer 40 is provided with a plurality of discrete fine wire circuit paths, some of which are shown at 42. Typically, each circuit path 42 may comprise a fine wire memory. HOwever it should be understood that each fine wire circuit path may have alternative functions. Another surface 44 of the substrate 36 which is in opposed relationship to the surface 38 is provided with a wafer 46 having a depending plurality of fine wire electrical circuit paths 48 similar in configuration and function to the paths 42 of the wafer 40. The fine wire electrical paths 42 are combed into respective registration within the grooves 8 provided in the sidewall 2. In similar fashion, the fine wire circuit paths 48 are combed respectively into respective grooves 8 provided in the sidewall 4. The levers 28 and 30 are resiliently pivoted toward one another about the laterally extending base portion 32, which action resiliently deforms the jaws or sidewalls of the generally U-shaped configuration 27 to slightly diverging configurations in order to receive the holder 1 therein. With the base portion 6 of the holder 1 received in registration against the laterally extending base portion 32, the levers 28 and 30 are allowed to resiliently return to their original positions, thereby allowing the jaw or sidewalls of the U-shaped configuration 27 to clampingly engage against the sidewalls 2 and 4 of the holder 1. Such action thereby clampingly retains each of the fine wire circuit paths 42 and 48 in registration within respective grooves 8. Additionally, such clamping action compresses the sidewalls 2 and 4 against the margin portion 34 of the substrate 36, thereby clampingly retaining the holder 1 in registration with the substrate 36. The holder 1 thus provides a bussing connector, since the plated electrical paths of the grooves 8 electrically connect together the fine wire circuit paths 48 with corresponding fine wire circuit paths 42.

With reference to FIG. 4, an alternative embodiment of the clamping apparatus 24 will be described in detail. With reference to FIG. 4, the clamping apparatus 24 may be modified with a series of slots, two of which are shown at 50. Each slot 50 is shown inclined with respect to the central U-shaped portion 27. Thus, as the U-shaped portion is formed, each slot 50 has a portion 52 thereof provided in the sidewall of the U-shaped configuration, which portion 52 is reversely inclined with respect to the remaining portion of the slot 50. In similar fashion, the flange portion 30 is provided with a series of parallel inclined slots 54, each of which is opposite to a slot 50, and each of which slots 54 includes a reversely inclined portion 56 provided in the jaws or sidewall of the U-shaped configuration opposite a corresponding slot portion 52. Thus, the clamping apparatus 24, shown in FIG. 4, is divided into a series of clamp segments, each with their own lever portions. Each clamp segment overlies a portion of an adjacent clamp segment defined by a slot portion either 52 or 56. Thus, although opening of a clamp segment is hindered by the overlying adjacent clamp segment, such overlying segment supplements the resilient clamping action of the adjacent segment for a more positive clamping action.

With reference to FIG. 8, another embodiment according to the present invention will be described in detail. In the Figure, there is illustrated two assemblies each having a substrate 36 received in a holder 1 with a clamping apparatus 24 clampingly retaining the holder to the substrate, and additionally clampingly retaining the fine wire circuit paths 42 and 48 within the discrete electrical circuit paths 8 provided in the holder 1. In addition, there is shown at 58 a flexible flat cable assembly of Mylar, for example, provided thereon with a plurality of discrete electrical circuit paths. One end of the cable 58 is received in a clamping apparatus 24 such that the end portions of the cable electrical paths are clampingly retained by the clamping apparatus 24 in electrical contact with the corresponding fine wire electrical paths 42 of a substrate 36. The corresponding remaining end portions of the cable electrical paths are retained clampingly by the other clamping apparatus 24 in electrical contact with corresponding fine wire electrical paths 48 of the other substrate 36. In such application, any desired number of bussing connectors 1 may be electrically associated by clamped lengths of flexible flat cables, similar to the cable shown at 58.

Other modifications and embodiments of the present invention are defined within the spirit and scope of the appended claims, wherein:

What is claimed is:

1. A bussing connector system for discrete electrical circuit paths on opposed sides of a substrate, comprising:

mounting means for detachable connection to the substrate, at lease one discrete circuit path on a surface of said mounting means electrically connecting a discrete electrical circuit path on one side of said substrate with a discrete electrical circuit path on the other side of said substrate, and retaining means of resilient spring material defining jaws resiliently clamped on said mounting means for clamping each of said discrete electrical paths on opposed sides of said substrate to said discrete circuit paths on said mounting means, said retaining means resiliently engages and clamps said discrete paths of said substrate to the discrete path of said mounting means, said retaining means being doubled back on itself to form lateral flange portions which define a pair of levers pivotable toward each other to resiliently deform said jaws of said retaining means to diverging configurations in order to receive said mounting means in said jaws.

2. The structure as recited in claim 1, wherein, said mounting means includes a channel means receiving said substrate.

3. The structure as recited in claim 1, wherein said retaining means further clamps together said mounting means and said substrate.

4. The structure as recited in claim 1, wherein said retaining means includes a series of clamp segments each independently clamping separate discrete circuit paths to said mounting means.

5. The structure as recited in claim 4, wherein said retaining means is provided with a plurality of parallel spaced, generally inclined slots in said flange portions in order to define said clamp segments, said inclined slots including reversely inclined slot portions in a corresponding jaw of said retaining means in order to define adjacent clamp segments in overlying relationship.

6. The structure as recited in claim 1, and further including: a flexible flat cable having circuit paths connected to and clamped against corresponding circuit paths of said substrate by said retaining means.

7. The structure as recited in claim 1, wherein said mounting means surface is provided with at least one slot which is lined with plating in order to define said discrete circuit path.

* * * * *